United States Patent [19]

Eggert et al.

[11] Patent Number: 4,638,320
[45] Date of Patent: Jan. 20, 1987

[54] DIRECTION FINDING INTERFEROMETER

[75] Inventors: Dennis J. Eggert, Hermosa Beach; Charles E. Hendrix, Pacific Palisades; Barnet Krinsky, Torrance, all of Calif.

[73] Assignee: Hughes Aircraft Company, Los Angeles, Calif.

[21] Appl. No.: 439,458

[22] Filed: Nov. 5, 1982

[51] Int. Cl.$^4$ .............................................. G01S 5/04
[52] U.S. Cl. .................................... 342/442; 342/424
[58] Field of Search ............... 343/370, 371, 372, 374, 343/424, 445, 446, 844, 853, 442, 443, 454; 367/125, 129

[56] References Cited

U.S. PATENT DOCUMENTS

| 2,422,026 | 6/1947 | Luck | 343/853 |
|---|---|---|---|
| 2,444,320 | 6/1948 | Woodward, Jr. | 343/844 |
| 3,979,754 | 9/1976 | Archer | 343/374 X |
| 4,075,635 | 2/1978 | Unz | 343/844 |
| 4,208,733 | 6/1980 | Orievx | 367/125 |
| 4,213,131 | 7/1980 | Kaiser, Jr. | 343/844 |
| 4,290,127 | 9/1981 | Pridham et al. | 343/372 X |

Primary Examiner—Charles T. Jordan
Assistant Examiner—Brian S. Steinberger
Attorney, Agent, or Firm—S. C. Durant; M. J. Meltzer; A. W. Karambelas

[57] ABSTRACT

A two-dimensional, long baseline (D) direction finding interferometer (12) is provided for obtaining unambiguous spatial position of an object. The interferometer comprises four antenna receiving means, (A1, A2, A3, A4) which are arranged in a two-dimensional, planar fashion. Three of the antenna means (A1, A2, A3) are positioned on two orthogonal axes ($D, D_2$). The remaining antenna (A4) means is positioned on a third axis ($D^1$) which is arranged asymmetrically and nonorthogonally to the orthogonal axes, whereby the unambiguous spatial position of the object is determined.

4 Claims, 18 Drawing Figures

BEAMWIDTH

DIRECTION FINDING INTERFEROMETER

TECHNICAL FIELD

This invention relates to direction finding interferometers and, more particularly, to two-dimensional, long-baseline direction finding interferometers.

BACKGROUND OF THE INVENTION

1. Field of the Invention

In order to detect the spatial direction of an incoming electromagnetic energy signal wave, interferometers are required. In particular, interferometers are used in radio astronomy for detecting celestial bodies or in range instrumentation for tracking moving objects such as aircraft, spacecraft, and missiles. One type of interferometer is the long-baseline type which permits a precise determination of the signal's direction of arrival. However, long-baseline interferometers are generally susceptible to a phenomenon which is generally referred to as ambiguities. The elimination of the ambiguities is the subject of the present invention.

2. Description of the Prior Art

In general, one-dimensional, long-baseline interferometers are common in the prior art. For example, such devices are disclosed in U.S. Pat. No. 4,213,131, by Kaiser, Jr., U.S. Pat. No. 4,136,342, by Alcock et al., and U.S. Pat. No. 3,852,754, by Worrell. More particularly, two-dimensional, long-baseline inteferometers are also disclosed in the prior art. For example, such devices are shown and described in E. Ehling, "Range Instrumentation", Prentice-Hall, Inc., Englewood Cliffs, N.J., 1967, pages 291–347. In addition, a two-dimensional interferometer is disclosed and described in U.S. Pat. No. 3,935,575, by Leisterer et al., and as an alternative embodiment in U.S. Pat. No. 4,213,131, by Kaiser, Jr. However, the two-dimensional interferometers in the prior art are deficient in several aspects.

One deficiency is that the prior art devices require a multiplicity of antenna elements, generally at least five or more, in order to function as a two-dimensional interferometer. For the two-dimensional interferometers disclosed in E. Ehling, "Range Instrumentation", supra, seven to ten antenna elements are used in each interferometer.

Another deficiency is that the prior art devices are incapable of eliminating ambiguities when detecting the incoming radio-frequency waves. For example, in the two-dimensional interferometer disclosed in U.S. Pat. No. 3,935,575, by Leisterer et al., elimination of ambiguities is limited to a short-baseline interferometer.

A further deficiency is that the prior art devices are dependent on the wavelength of the incoming radio-frequency waves. In the interferometers disclosed in U.S. Pat. No. 4,213,131, by Kaiser, Jr. and U.S. Pat. No. 3,852,754, by Worrell, the antenna elements are spaced apart by integral multiples of one-quarter and one-half wavelengths, respectively.

SUMMARY OF THE INVENTION

In view of such deficiencies in the prior art, it is a purpose of the present invention to provide a two-dimensional, long-baseline direction finding interferometer which employs four antenna receiving means.

It is another purpose of the present invention to provide a two-dimensional, long-baseline direction finding interferometer which is capable of eliminating ambiguities when detecting the incoming radio-frequency waves.

It is a further purpose of the present invention to provide a two-dimensional, long-baseline direction finding interferometer which is independent of the wavelength of the incoming radio-frequency waves.

In order to accomplish the above and still further purposes, the present invention provides a novel two-dimensional, long-baseline direction finding interferometer for obtaining the unambiguous spatial position of an object.

More particularly, the interferometer comprises four antenna receiving means arranged in a two-dimensional, planar fashion, with three of the antenna means being positioned on two orthogonal axes. The remaining one of the antenna means is positioned on a third axis which in turn is arranged asymmetrically and non-orthogonally to the orthogonal axes, whereby the unambiguous spatial position of the object is determined.

One advantage of the present invention is that only four antenna receiving means are employed in the novel two-dimensional, long-baseline direction finding interferometer. Another advantage is that the elimination of ambiguities of incoming radio-frequency waves is accomplished by the novel two-dimensional, long-baseline direction finding interferometer. A further advantage of the present invention is that the antenna receiving means of the novel two-dimensional, long-baseline direction finding interferometer are positioned independent of the wavelength of the incoming radio-frequency waves.

Other purposes, features and advantages of the present invention will appear from the following detailed description of a preferred embodiment thereof, taken together with the accompanying drawings.

BRIEF DESCRIPTION OF THE DRAWINGS

FIG. 4b is a simplified diagrammatical view of an antenna beam pattern emanating from an antenna element of the interferometer of FIG. 4a;

FIG. 5b is a simplified cross-sectional view of a main antenna beam produced by the three antenna elements of FIG. 5a;

FIG. 6b is a simplified cross-sectional view of a main antenna beam produced by the four antenna elements of FIG. 6a;

FIG. 7a is a simplified frontal view of a two-dimensional, long-baseline interferometer which comprises four asymmetrically arranged antenna elements in accordance with the present invention;

FIG. 7b is an enlarged detailed view of the interferometer of FIG. 7a;

FIG. 7c is a simplified cross-sectional view of a main antenna beam produced by the four asymmetrically arranged antenna elements of FIG. 7a;

FIG. 8 is a simplified block diagram of a receiving system employing the asymmetrically arranged four antenna element interferometer of FIG. 7a; and FIGS. 9a through 9d are simplified frontal views of alternative embodiments of the asymmetrically arranged, four antenna element interferometer of FIG. 7a.

DETAILED DESCRIPTION OF THE INVENTION

Figure 1:
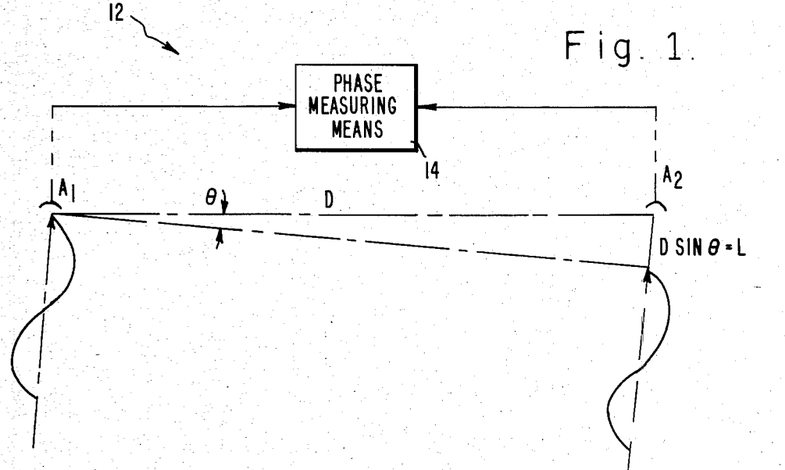
FIG. 1 is a simplified diagrammatical view of an one-dimensional, long-baseline interferometer, depicting direction finding of incoming radio-frequency waves.
Figure 4A:
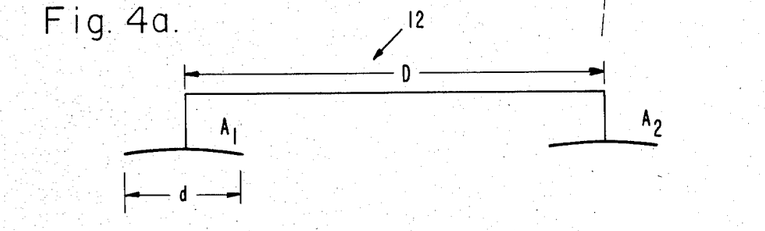
FIG. 4a is a simplified enlarged view of the interferometer of FIG. 1.

Referring to FIG. 1, there is shown a one-dimensional, long baseline direction finding interferometer, generally designated 12. Interferometer 12, in the simplified example shown in FIG. 1, comprises two collinearly-positioned antenna receiving elements $A_1$, $A_2$, the outputs of which are compared by a phase measuring means 14. One-dimensional, as defined, means the capability of interferometer 12 to detect the spatial direction of an incoming electromagnetic energy signal wave in only one geometric plane. Long baseline, as defined, means a baseline length, D, between antenna elements $A_1$, $A_2$, which is greater than the aperture width or diameter, d, of an antenna element, as best shown in FIG. 4a.

The concept of one-dimensional interferometry, as exemplified by interferometer 12, is the phase comparison of an incoming signal wave. The signal wave, impinging an interferometer 12 at an angle not normal to antenna elements $A_1$ and $A_2$, is detected by antenna elements $A_1$ and $A_2$ at different instances of time. Thus, the signal wave detected by each antenna element is at a different location or phase. The detected signals of antenna elements $A_1$ and $A_2$ are compared by phase measuring means 14 to produce a phase difference, $\phi$, between the two detected signals.

The basis of phase comparison is the relationship between the speed of light, c, and the frequency of the signal wave, f, and its wavelength, $\lambda$.

$$c = F\lambda$$

In addition, the signal wave travels a distance, L, in a certain time, T, where $$T = (L/c)$$

Moreover, the phase of the signal wave advances through an angle of $2\pi fT$ with respect to time zero. Therefore, one signal wave may be said to lag behind another signal wave by $2\pi fT$ or $\phi$. Utilizing the geometric parameters shown in FIG. 1, the signal wave impinging on antenna element $A_2$ lags behind the signal wave impinging on antenna element $A_1$ by a distance L or $D \sin \theta$. Substituting L into the phase equation given previously, the phase measured by means 14 is $$\phi = 2\pi fT = 2\pi f \frac{L}{c} = 2\pi f \frac{L}{f\lambda} = 2\pi \frac{L}{\lambda}$$

-continued
$$= \frac{2\pi}{\lambda} D \sin\theta$$

Since the angle of incidence or direction of arrival, $\theta$, is a function of phase $\phi$, angle $\theta$ is readily determined. The signal wavelength $\lambda$ of the signal wave is assumed to be known. The equation for solving angle $\theta$ is $$\theta = \sin^{-1} \frac{\lambda\phi}{2\pi D}$$

Figure 2:
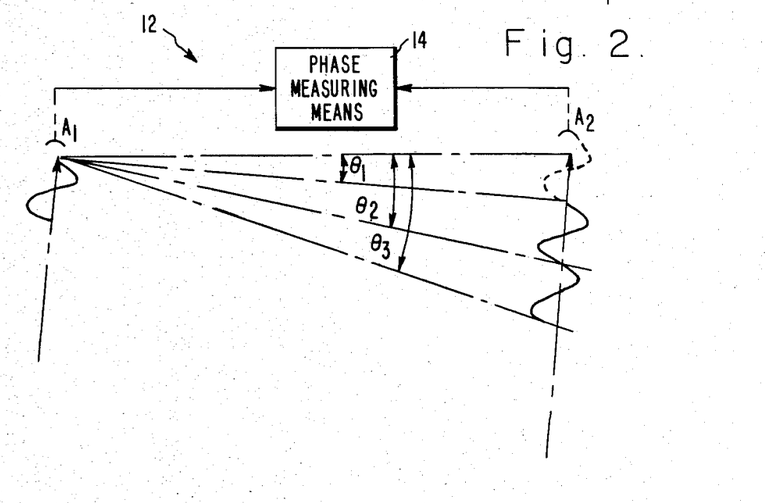
FIG. 2 is a simplified diagrammatical view of the interferometer of FIG. 1, depicting ambiguities in direction finding.

However, because of the cyclical nature of phase, there can be multiple or ambiguous solutions for $\theta$, as depicted in FIG. 2. This is the basic ambiguity problem. Since a signal wave propagates through a distance of $2\pi$ radians in each cycle, the direction of arrival $\theta$ may be a multiplicity of possible directions of arrival, each of which having the identical phase $\phi$. Thus, the ambiguity equation is $$\theta_{n+1} = \sin^{-1} \frac{\lambda}{2\pi D} (\phi + 2\pi n),$$

where n is a zero or an integer.

Figure 3:
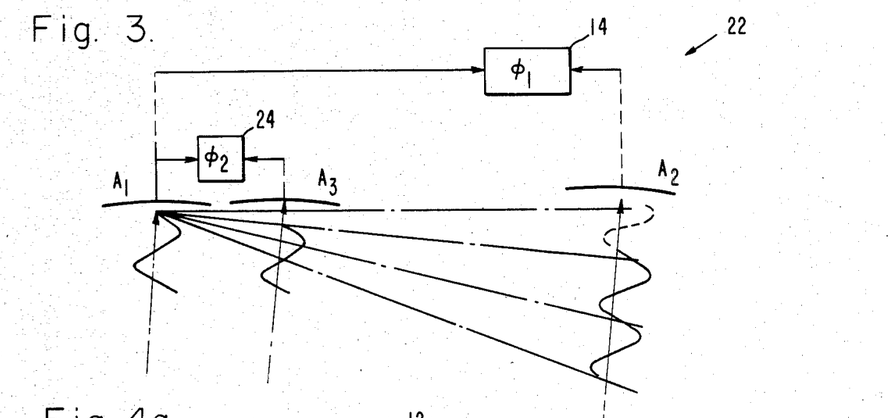
FIG. 3 is a simplified diagrammatical view of the interferometer of FIG. 1, depicting resolution of ambiguities.

In one approach to resolve the ambiguity problem, an interferometer 22 which has three antenna elements may be used. A third antenna element $A_3$, as shown in the example in FIG. 3, is positioned between antenna elements $A_1$ and $A_2$. The baseline $D_2$ between antenna elements $A_1$ and $A_3$ is shorter than or is at most the length of the diameter of an antenna aperture d. A second phase measuring means 24 is positioned between antenna elements $A_1$ and $A_3$. Having a baseline $D_2$ smaller or equal to the aperture diameter d, the phase, $\phi_2$, measured by antenna elements $A_1$ and $A_3$, is restricted to one cycle. This eliminates the possibility of ambiguities.

However, such a short baseline interferometer is generally less precise because it is affected by conventional errors and noises. This can easily be shown by examining the previously stated equation $$\theta = \sin^{-1} \frac{\lambda\phi}{2\pi D}$$

In order to obtain a precise measurement of angle $\theta$, either the wavelength $\lambda$ of the signal wave is decreased or the distance D of the baseline is increased. A long baseline D, that is a large numeral in the denominator of the equation, causes angle $\theta$ to be more precise. Therefore, a long-baseline interferometer is more accurate. With phase measuring means 14 accurately measuring $\phi_1$ between antenna elements $A_1$ and $A_2$ to determine the direction of arrival $\theta$, phase measuring means 24 measures $\phi_2$ between $A_1$ and $A_3$ to eliminate the ambiguity problem.

Figure 4B:
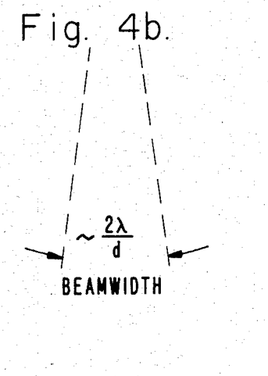
Figure 4C:
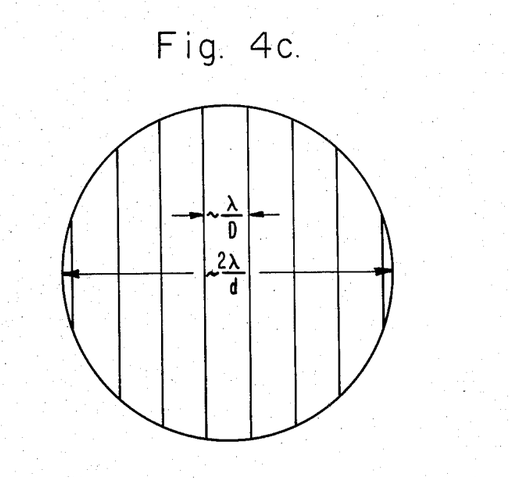
FIG. 4c is a simplified cross-sectional view of a composite main antenna beam produced by the two antenna elements of FIG. 4a, taken at the half-power point.

For more accurate and realistic determination of the direction of arrival of objects in three-dimensional space such as aircraft or missiles, two-dimensional interferometers are necessary. In this approach, representation of the operation of the two-dimensional interferometer is best diagrammed in three-dimensional space. In general, as best shown by FIG. 4b, each antenna element of interferometer 12 of FIG. 4a has a restricted beamwidth of approximately $(2\lambda)/d$. When the beams of antenna elements $A_1$ and $A_2$ are projected sufficiently far from interferometer 12, they mathematically merge into a single composite main antenna beam, a cross-section of which is shown in FIG. 4c. Further, the ambiguous directions of arrival may be expressed in terms of a series of planes, each of which represents one of the possible directions. All of the planes emanate from a representative midpoint on baseline D of interferometer 12. The planes, as defined, relate in common to a line that is perpendicular to baseline D at the midpoint. The cross-sectional view of the main antenna beam at the half power point illustrates the series of ambiguity planes as a series of parallel lines, as best shown in FIG. 4c. The angular separation between adjacent ambiguity planes is approximately $\lambda/D$ radians. The angular beamwidth of the composite main antenna beam is also approximately $2\lambda/d$, where d is the diameter of the antenna aperture. Thus, there are approximately $2D/d$ ambiguities in the main beam.

Figure 5A:
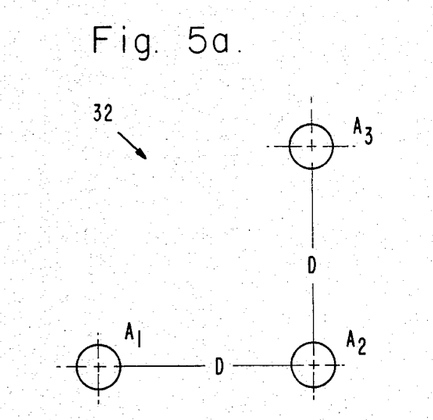
FIG. 5a is a simplified frontal view of a two-dimensional, long-baseline interferometer which comprises three antenna elements.
Figure 5B:
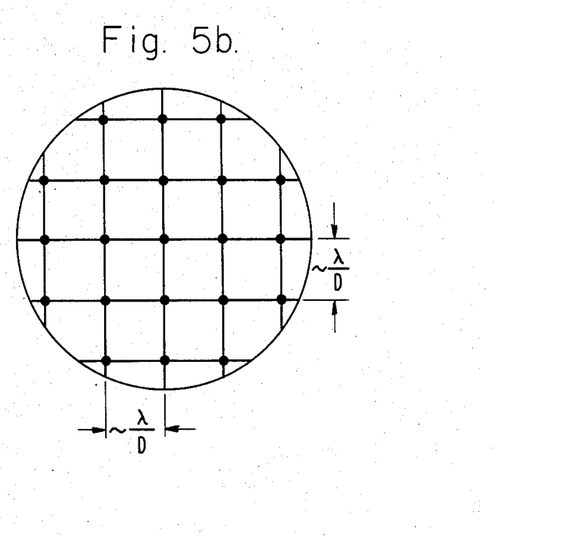
Figure 6A:
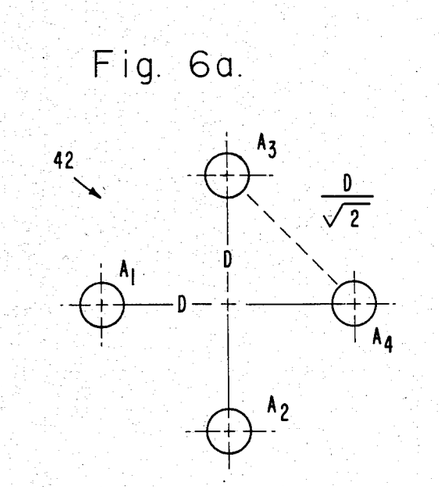
FIG. 6a is a simplified frontal view of a two-dimensional, long-baseline interferometer which comprises four antenna elements.
Figure 6B:
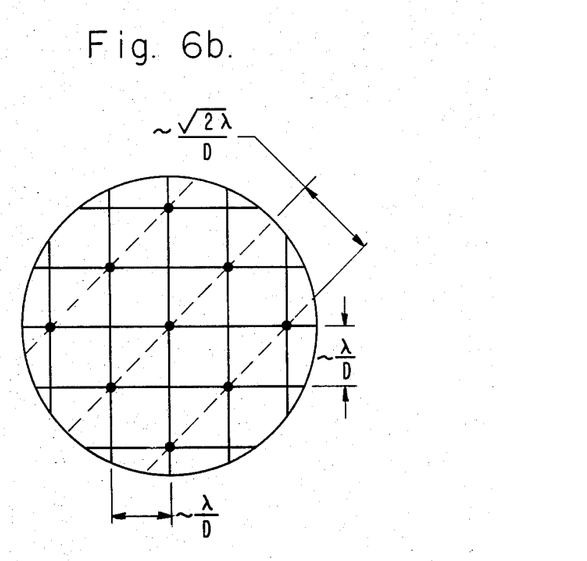

In a two-dimensional, long-baseline interferometer, as shown by an exemplary interferometer 32 in FIG. 5a, three antenna elements $A_1$, $A_2$ and $A_3$ are arranged in a two-dimensional planar fashion. The antenna elements are positioned on two orthogonal axes, and the distance between any two antenna elements on any one axis is the same, that is, distance D. In the composite main antenna beam, as best shown in FIG. 5b, there are two sets of parallel planes, each of which is orthogonal to the other. The ambiguous directions of arrival now occur at the intersections of the two sets of ambiguity planes. Standard sidelobe suppression techniques are used to exclude signal waves that are outside the main antenna beam. Thus, any system for removing ambiguities will have to deal with, at most, approximately $(2D/d)^2$ ambiguous directions of arrival. However, this number can be halved by using the interferometer shown in FIG. 6a. In the exemplary interferometer 42 shown in FIG. 6a, four antenna elements $A_1$, $A_2$, $A_3$ and $A_4$ are positioned on two orthogonal axes. The distance D between antenna elements $A_1$ and $A_4$ is the same as the distance D between $A_2$ and $A_3$. Moreover, the addition of fourth antenna element $A_4$ has provided a third baseline, as shown by the dotted line in FIG. 6a, to permit independent phase measurements. The distance between antenna elements $A_3$ and $A_4$ on the third baseline is $D/\sqrt{2}$. The possible directions of arrival exist, therefore, at only where the three ambiguity planes intersect, as best shown in FIG. 6b. Thus, the number of ambiguities is only half of that for the three antenna element interferometer shown in FIG. 5b.

Figures 7A, 7B, 7C:
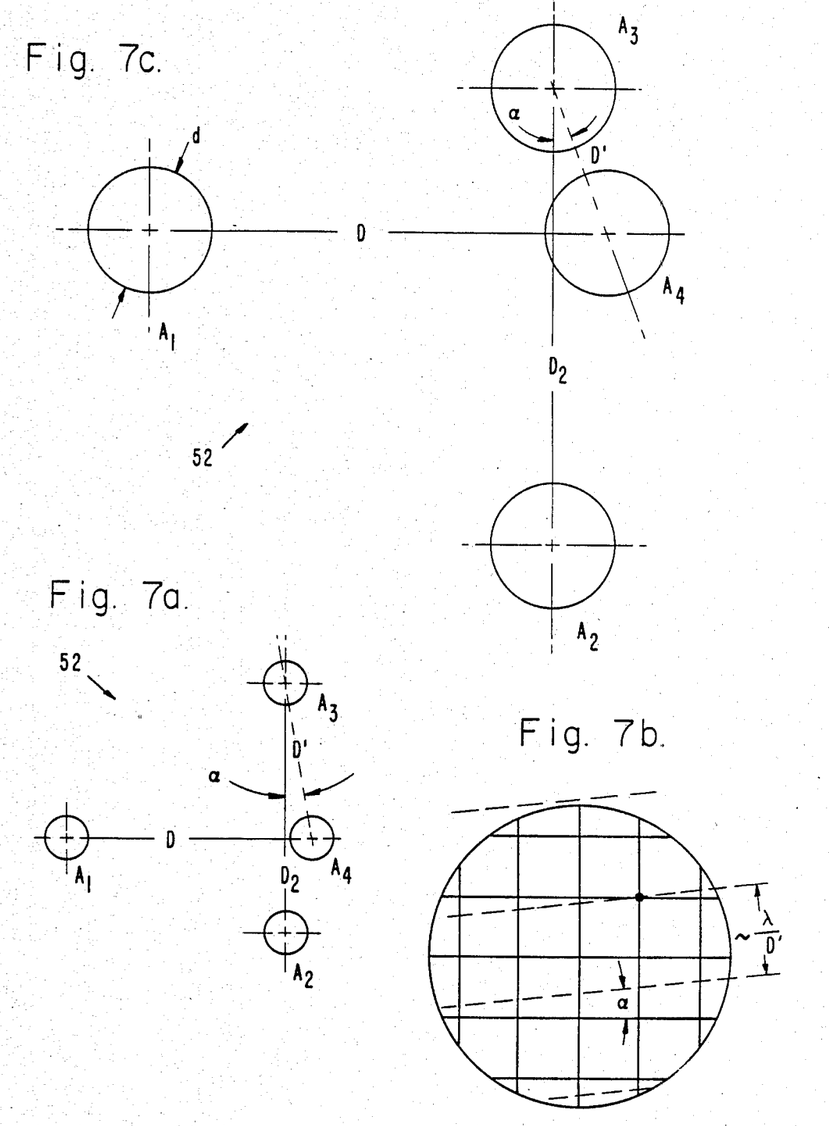

In accordance with the present invention, it is possible to exploit the degrees of freedom provided by the third baseline, as best shown in FIG. 7a. Length D' and angle $\alpha$ may be adjusted with respect to the other two baselines. According to the present invention, adjustments are made such that all three planes intersect at only one point within the main antenna beam, as best shown in FIG. 7b.

More particularly, the two-dimensional, long-baseline direction finding interferometer 52 of the present invention comprises four antenna elements $A_1$, $A_2$, $A_3$ and $A_4$, which are arranged in a two-dimensional, planar fashion. The first antenna element $A_1$ is positioned on one of the two orthogonal axes. The second antenna element $A_2$ is positioned on the second of the two orthogonal axes. Similarly, the third antenna element $A_3$ is positioned on the second orthogonal axis. The fourth antenna element $A_4$ is positioned on both the first orthogonal axis and a third axis. The third axis is arranged asymmetrically the non-orthogonally to the two orthogonal axes. The fourth antenna element $A_4$ is positioned on the third axis relative to the third antenna element $A_3$.

The center-to-center distance D between the first antenna element $A_1$ and the fourth antenna element $A_4$ is the same as the distance between the second and third antenna elements $A_2$ and $A_3$, respectively. Moreover, the distance D is greater than the aperture diameter d of any of the four antenna elements. As best shown in both FIGS. 7a and 7c, the fourth antenna element $A_4$ is positioned on the third axis at a distance D' away from the third antenna element $A_3$. The asymmetrically positioned third axis and the second orthogonal axis create an angle, $\alpha$, therebetween. Further, antenna elements $A_1$, $A_2$, $A_3$ and $A_4$ are positioned independent of the wavelength of the incoming radio-frequency waves. The antenna elements are not required to be spaced apart by integral multiples of one-quarter or one-half wavelengths.

In the preferred embodiment, as best shown by the exemplary interferometer 52 shown in FIG. 7c, the distance D is approximately 15 feet and the diameter d is approximately 4 feet. In accordance with the present invention, the distance D' is approximately 5.27 feet and the angle $\alpha$ is approximately 20.56°.

Figure 8:
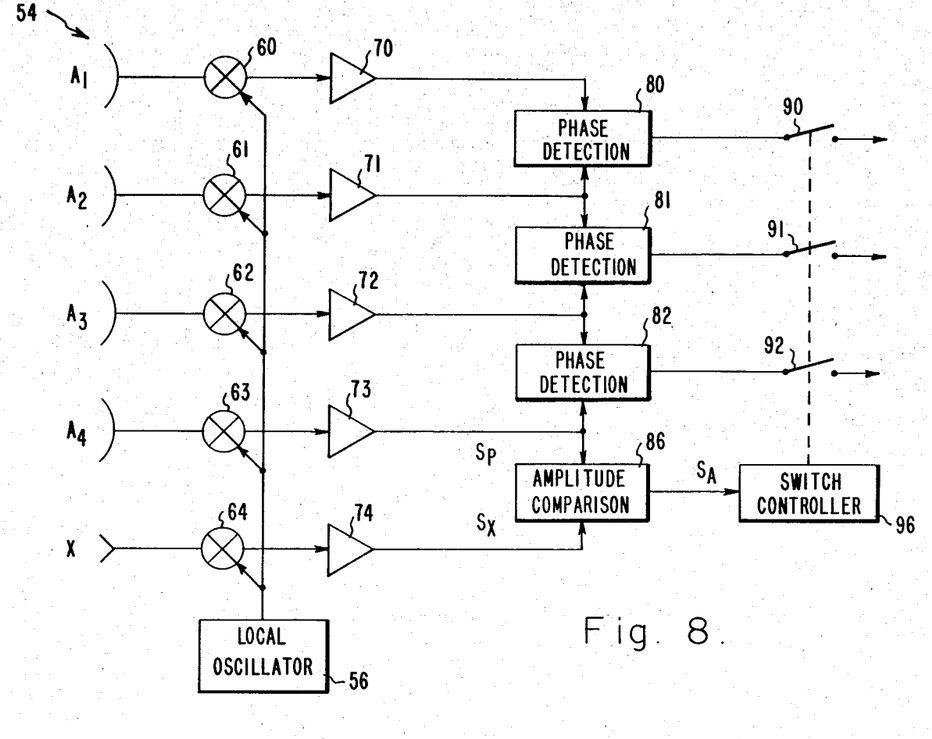
Figure 9A:
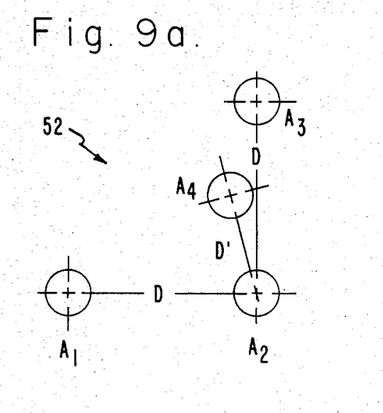
Figure 9B:
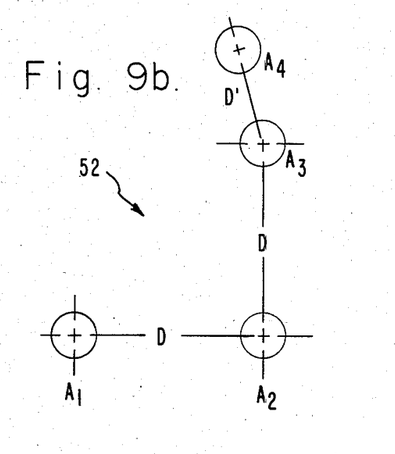
Figure 9C:
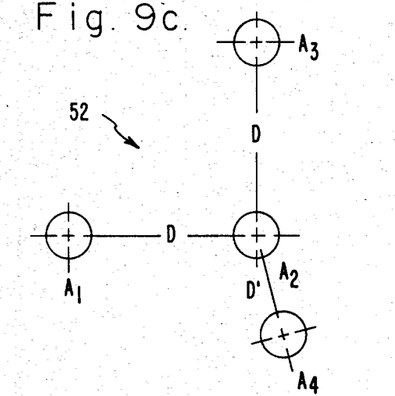
Figure 9D:
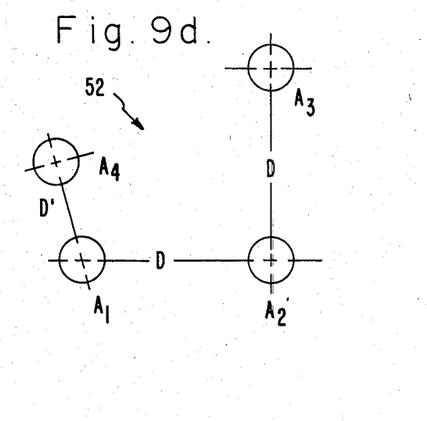

Referring to FIG. 8, there is shown a receiving system, generally designated 54, for the asymmetrically arranged, four antenna element interferometer 52 of FIG. 7a. In general, receiving system 54 comprises a plurality of primary antenna elements $A_1$, $A_2$, $A_3$ and $A_4$, an auxiliary antenna element X, a common local oscillator 56, a plurality of mixers 60 through 64, a plurality of intermediate-frequency (IF) filter/amplifiers 70 through 74, a plurality of phase detectors 80 through 82, an amplitude comparator 86, a plurality of switches 90 through 92, and a switch controller 96. Each of the circuit elements is common in the prior art. However, the arrangement of these elements in receiving system 54 is novel.

More particularly, auxiliary antenna element X is provided to permit system 54 to reject received errant signal waves. Each of the mixers 60 through 64 receives both an input signal from one of the antenna elements and a signal from common local oscillator 56. For example, the input signal from antenna element $A_2$ is received by mixer 61 and the input signal from auxiliary antenna element X is received by mixer 64. An output signal from each of the mixers is inputted into one of the IF filter/amplifiers 70 through 74. As an example, the output from mixer 61 is inputted to its corresponding IF filter/amplifier 71.

Next, each of the phase detectors 80 through 82 compares the output signals from two adjacent IF filter/amplifiers. For example, phase detector 80 compares the output signals from IF filter/amplifiers 70 and 71. In addition, amplitude comparator 86 is provided to compare the output signal from one of the IF filter/amplifiers that originated from one of the primary antenna elements $A_1$ through $A_4$ and the output signal from one IF filter/amplifier that originated from auxiliary antenna element X. Amplitude comparator 86 is adapted to detect whether the amplitude of the signal wave detected by one of the four primary antenna elements is greater than the amplitude of the signal wave detected by auxiliary antenna element X. This is necessary in a technique generally referred to as sidelobe suppression. The amplitude of the signal waves detected by auxiliary antenna element X is generally smaller than the amplitude detected by the primary antenna elements. Signal waves detected by auxiliary antenna element X are generally those of the sidelobes. However, the main antenna beam and not the sidelobe beams is the signal of interest. Thus, amplitude comparator 86 outputs an acceptance signal whenever the amplitude of the signal wave from one of the primary antenna elements is greater than the amplitude of the signal wave from the auxiliary antenna element.

In the example of FIG. 8, the signal from one of the primary antenna elements, A4, is Sp and the signal from auxiliary antenna element X is $S_X$. Amplitude comparator 86 outputs an acceptance signal, $S_A$, whenever the amplitudes of $S_P$ is greater than $S_X$. Lastly, switch controller 96 closes switches 90 through 92 when acceptance signal $S_A$ is present. The closing of switches 90 through 92 allows the output signals from their corresponding phase detectors 80 through 82 to propagate through system 54 for further processing. The further processing by conventional techniques permits the determination of the direction of arrival $\theta$.

It will be apparent to those skilled in the art that various modifications may be made within the spirit of the invention and the scope of the appended claims. For example, primary antenna elements $A_1$ through $A_4$ and auxiliary antenna element X may be replaced with comparable sonar transducers such that interferometer 52 may be used to detect the spatial position of a submerged object in liquid.

Moreover, alternative embodiments of interferometer 52 may be provided, as best shown in FIGS. 9a through 9d. Interferometer 52 comprises four antenna elements $A_1$, $A_2$, $A_3$ and $A_4$ which are arranged in a two-dimensional, planar fashion. The first antenna element $A_1$ is positioned on one of the two orthogonal axes. The second antenna element $A_2$ is positioned at the intersection of the orthogonal axes. The third antenna element $A_3$ is positioned on the second orthogonal axis. The fourth antenna element $A_4$ is positioned on a third axis which is arranged asymmetrically and non-orthogonally to the orthogonal axes. The fourth antenna element $A_4$ may be positioned on the third axis relative to and spaced away from any of the three orthogonal antenna elements. For example, antenna element $A_4$ is spaced away from antenna element $A_1$ in FIG. 9d; from antenna element $A_2$ in FIGS. 9a and 9c; and from antenna element $A_3$ in FIG. 9b.

We claim:

1. A two-dimensional, long-baseline direction finding interferometer receiving system comprising:
    a plurality of primary antenna receiving means, said plurality comprising
        four primary antenna receiving means arranged in a two-dimensional planar fashion, with three of said primary antenna means being positioned on two orthogonal axes, and
        a remaining one of said primary antenna means positioned on a third axis, which is arranged asymmetrically and non-orthogonally to said orthogonal axes;
    an auxiliary antenna receiving means for permitting said system to reject errant signals;
    a common local oscillator means;
    a plurality of mixer means, each of which is connected respectively to one of said antenna receiving means and said common local oscillator means;
    a plurality of filter amplifier means, each of which is adapted to receive the output signal from a corresponding one of said mixer means;
    a plurality of phase detection means, each of which is adapted to compare the output signals of two adjacent filter amplifier means;
    an amplitude comparison means which is adapted to compare the output signal of one of said primary antenna means with the output signal of said auxiliary antenna means, said amplitude comparison means producing an output acceptance signal when the amplitude of said signal from one of said primary antenna means exceeds the amplitude of said signal from said auxiliary antenna means;
    a plurality of switches, each of which is adapted to receive the output signal from one of said phase detection means; and
    a switch controller connected to said amplitude comparison means is adapted to close said plurality of switches when said output acceptance signal is present to allow said signals from said plurality of phase detection means to propagate through said interferometer receiving system for further processing.

2. The direction finding interferometer as claimed in claim 1, wherein
    said plurality of primary antenna receiving means comprises
        four primary antenna receiving means arranged in a two-dimensional, planar fashion, with three of said primary antenna means being positioned on two orthogonal axes;
        a first of said primary antenna means is positioned on one of said orthogonal axes;
        a second of said primary antenna means is positioned on another of said orthogonal axes;
        a third of said primary antenna means is positioned on said another orthogonal axis; and
        a fourth of said primary antenna means is positioned on both said one orthogonal axis and a third axis, which is arranged asymmetrically and non-orthogonally to said orthogonal axes, said fourth primary antenna means is positioned on said third axis relative to and spaced away from said third primary antenna means.

3. The direction finding interferometer as claimed in claim 1, wherein
    said plurality of primary antenna receiving means comprises
        four primary antenna receiving means arranged in a two-dimensional, planar fashion, with three of said primary antenna means being positioned on two orthogonal axes;
        a first of said primary antenna means is positioned on one of said orthogonal axes;
        a second of said primary antenna means is positioned at the intersection of said orthogonal axes;
        a third of said primary antenna means is positioned on another of said orthogonal axes; and
        a fourth of said primary antenna means is positioned on a third axis, which is arranged asymmetrically and non-orthogonally to said orthogonal axes.

4. The direction finding interferometer as claimed in claim 1, wherein
    said antenna receiving means is a sonar transducer means adapted to detect signals which propagate in liquids.

* * * * *